Nov. 2, 1954 W. H. TEETER 2,693,089
OPEN-TOP DISPLAY REFRIGERATING APPARATUS
Filed Jan. 19, 1953 3 Sheets-Sheet 1

INVENTOR.
Wilford H. Teeter
BY
Willits, Hardman & Fehr.
Attorneys

Nov. 2, 1954 W. H. TEETER 2,693,089
OPEN-TOP DISPLAY REFRIGERATING APPARATUS
Filed Jan. 19, 1953 3 Sheets-Sheet 2
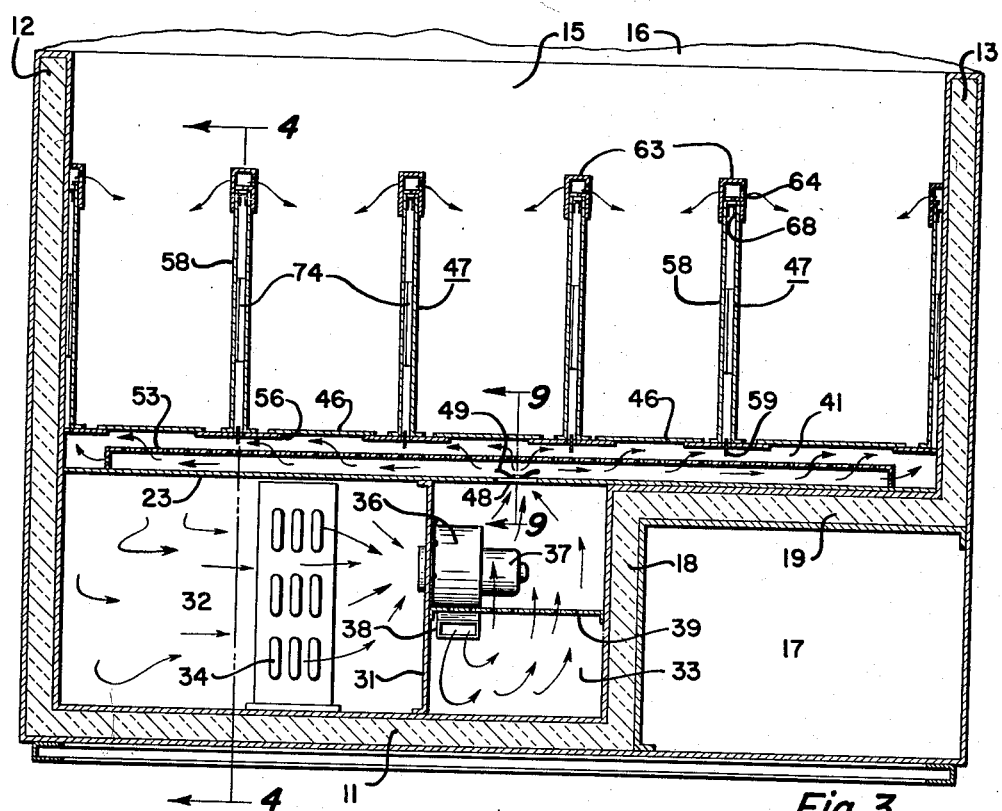
Fig. 3
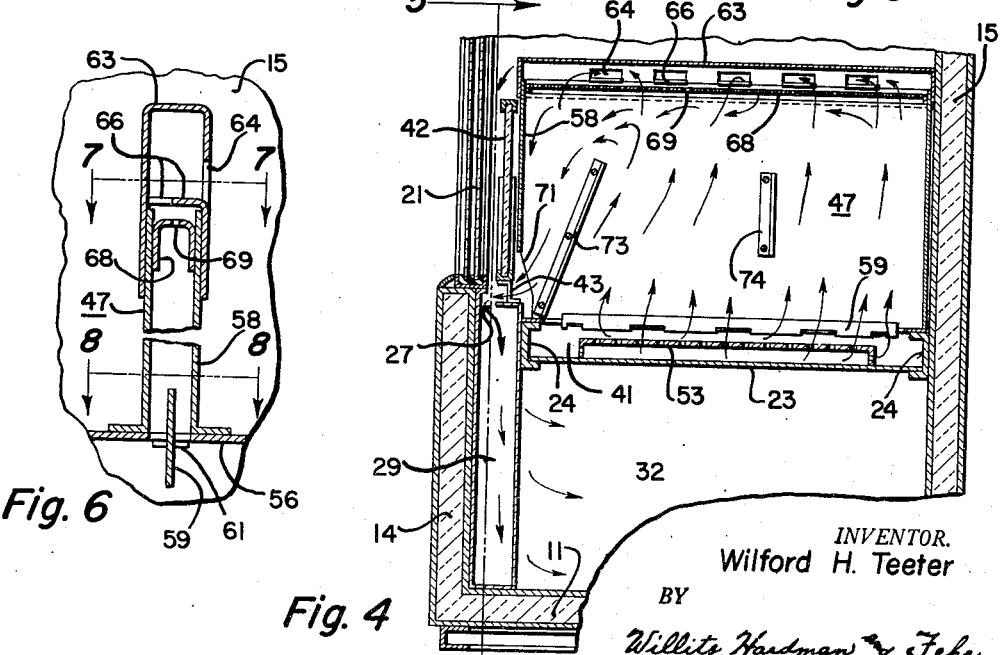
Fig. 6
Fig. 4
INVENTOR.
Wilford H. Teeter
BY
Willits, Hardman & Fehr.
Attorneys

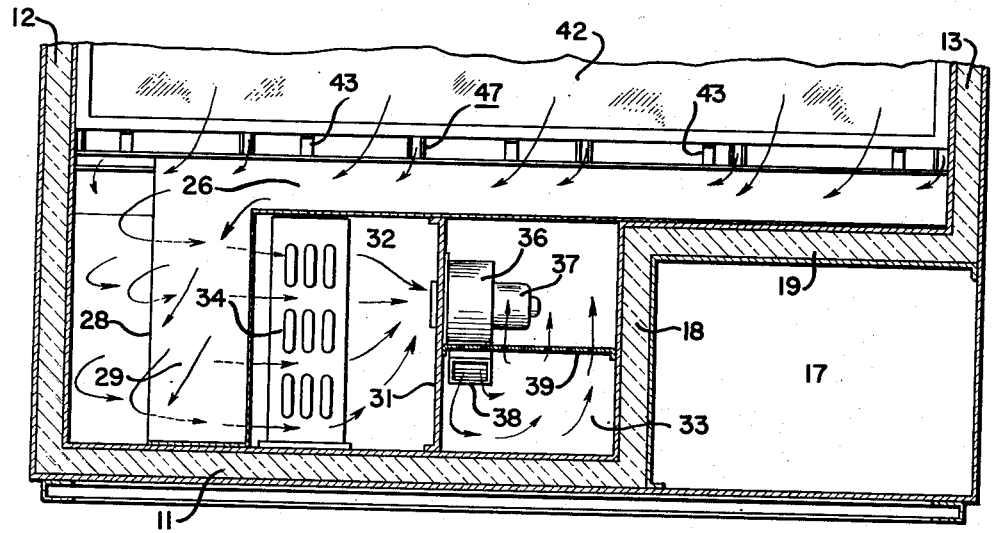
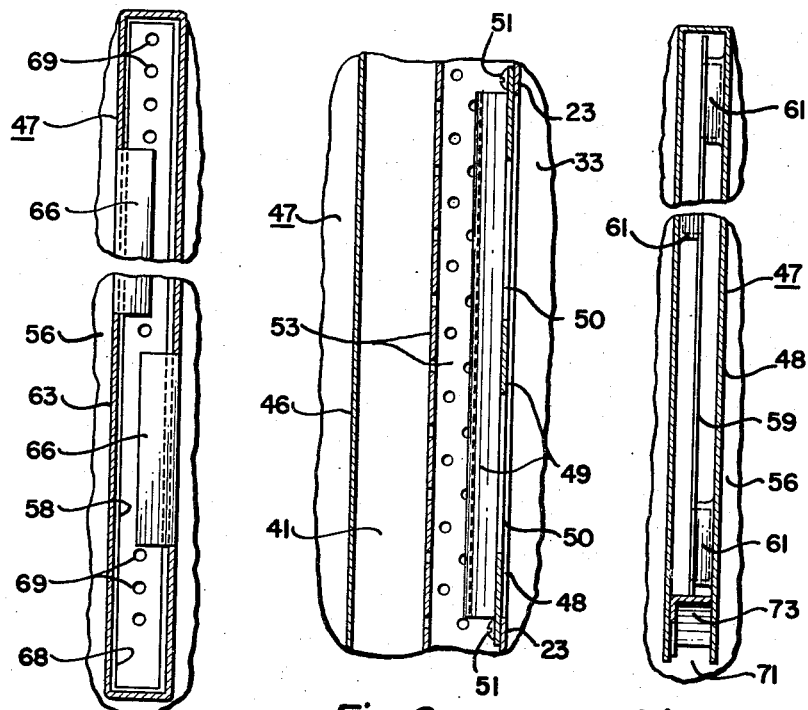

United States Patent Office 2,693,089
Patented Nov. 2, 1954

2,693,089

OPEN-TOP DISPLAY REFRIGERATING APPARATUS

Wilford H. Teeter, Dayton, Ohio, assignor to General Motors Corporation, Detroit, Mich., a corporation of Delaware Application January 19, 1953, Serial No. 331,989

13 Claims. (Cl. 62—89.5)

This invention relates to refrigerated display cases.

The present trend is to store and display packaged ice cream in a substantially open top refrigerated case as distinguished from ice cream storage cabinets having movable top closure covers or lids. Food technologists are now generally in agreement that ice cream should not, if its flavor, high quality and preserving appearance is to be retained, be stored at temperatures above 10° F. Thus it is desirable to store packaged ice cream and sherbets in retail stores in refrigerated cases where the air therein must be initially cooled to substantially sub-zero temperatures in order to preserve the contents of the packages in a hard-frozen condition, as distinguished from a merely frozen condition of a few degrees below 32° F., so as to assure proper preservation and the greatest customer satisfaction. This presents difficult problems in open top refrigerated cases wherein air is cooled to sub-zero temperatures in an air treating compartment, remote from the food storage and display compartment therein, and is then circulated about and over packaged ice cream located in the storage compartment. If the sub-zero air is circulated too fast or at a high velocity in the vicinity of the open top of the case, a great turbulence and mixing with outside air is created, thus rendering the display case inefficient. Yet such high velocity of the air is desired in all other portions of the display cabinet to prevent the air from increasing substantially in temperature after leaving the air cooling or treating compartment.

An object of my invention is to provide a substantially open top ice cream storage and display case with an improved forced circulation of air therein to obtain efficient chilling at sub-zero temperatures of the ice cream.

Another object of my invention is to provide a substantially open top ice cream storage and display cabinet with air circulating ducts or passages wherein sub-zero temperatured air is circulated at a relatively high velocity and has this velocity reduced at the point where the air is circulated over the packaged ice cream in exposed relation to air outside and adjacent the open top of the cabinet so as to form a somewhat stratified layer or blanket of cold air over the packaged ice cream to refrigerate and protect the uppermost packages.

A further object of my invention is to divide a food supporting device in a refrigerated display case into a plurality of open top compartments by spaced apart vertical hollow flue elements which compartments permit variously flavored packaged ice cream stored in the case to be properly segregated and which flue elements break up the total load in the case and provides more effective cooling by conduction of the packaged ice cream.

A still further object of my invention is to provide a uniform flow of sub-zero temperatured air into spaced apart vertical hollow flue forming elements of a food supporting device of a display case, to restrict egression of the air from the flues, to release or discharge air retarded by the restricting means out of at least one side edge thereof for direct return to the air treating compartment within the case whereby this retarded air by-passes the flow of air over the top packages of ice cream of the vertical rows or tiers thereof located in the storage device.

In carrying out the preceding objects, it is a more specific object of my invention to circulate air cooled to a sub-zero temperature in an air treating compartment located at one end of a refrigerated display case therefrom into an adjacent plenum chamber and from the plenum chamber lengthwise of the case uniformly into longitudinally spaced apart upright flue forming elements, outwardly therefrom onto and over packaged ice cream stored in the case, and to return the air in a direction lengthwise of the case to the air treating compartment for rechilling the same, whereby rows or tiers of packaged ice cream are cooled mainly by conduction from elements of a food supporting device in the case and the uppermost of the packages in the tiers thereof adjacent the open top of the case are further cooled and protected from air exteriorly of the case by convection air currents thereover.

Further objects and advantages of the present invention will be apparent from the following description, reference being had to the accompanying drawings wherein a preferred form of the invention is clearly shown.

In the drawings:

Figure 3 is a longitudinal vertical sectional view of the case taken on the line 3—3 of Figure 2;

Figure 4 is a fragmentary sectional view of the display case taken on the line 4—4 of Figure 3 through one of the hollow flue forming elements in the case;

Figure 5 is a fragmentary vertical sectional view of the case taken on the line 5—5 of Figure 4 showing an air return duct therein;

Figure 6 is an enlarged fragmentary vertical sectional view taken on the line 6—6 of Figure 2 showing the construction of one of the hollow flue forming elements in the case;

Figure 7 is a horizontal fragmentary sectional view taken on the line 7—7 of Figure 6 showing a restrictor within the hollow flue forming element disposed below outlet openings in the cap member thereon;

Figure 8 is a horizontal fragmentary sectional view taken on the line 8—8 of Figure 6 showing an air scoop along the open bottom end of one of the hollow flue forming elements; and Figure 9 is an enlarged fragmentary vertical sectional view taken on the line 9—9 of Figure 3 showing a deflecting baffle over the plenum chamber outlet in the display case.

Figure 2:
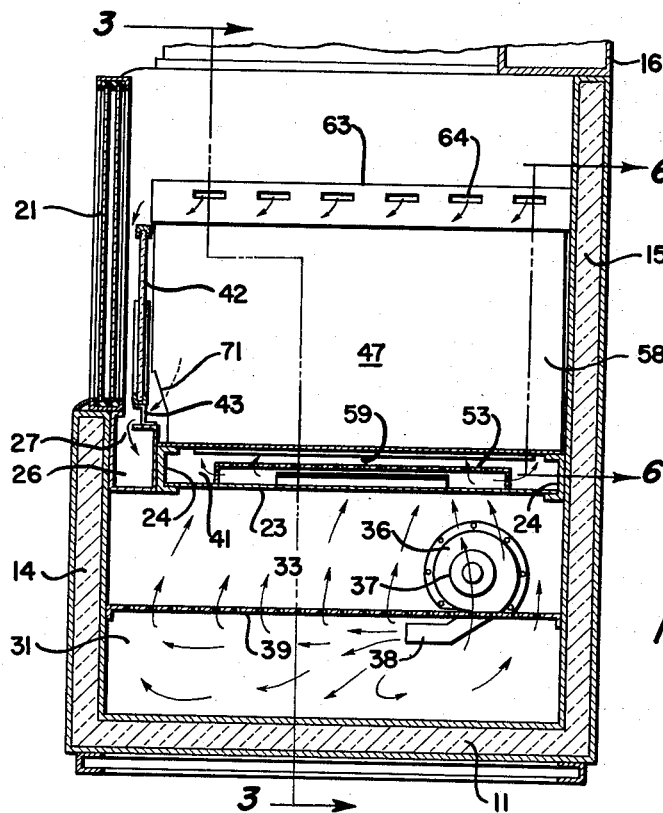
Figure 2 is an enlarged transverse sectional view of the display case disclosed in Figure 1 and is taken on the line 2—2 thereof.
Figure 1:
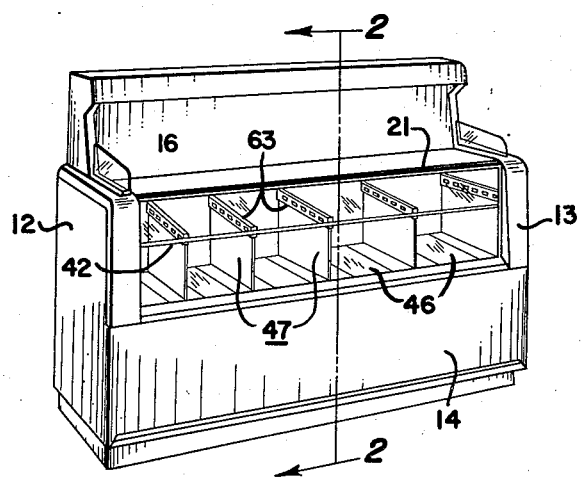
Figure 1 is a perspective view of a refrigerated display case having my invention embodied therein.

In Figure 1 of the drawings I disclose an elongated display case comprising a substantially open top cabinet including an insulated bottom wall 11 (see Figures 2 and 3), upright insulated end walls 12 and 13, a long upright insulated front wall 14, a long upright insulated back wall 15 and a rear hood-like superstructure 16. All of the vertical or upright insulated walls of the cabinet terminate in substantially the same horizontal plane and the superstructure 16 extends above these walls to serve as a display board to indicate various food products stored in the case. The display case disclosed is of the so-called self-contained type wherein a complete closed refrigerating system is mounted therein. A machine compartment 17 (see Figures 3 and 5) is provided in the lower portion of one end of the cabinet for housing the refrigerant liquefying or translating unit portion (not shown) of the closed refrigerating system. This machine compartment 17 is formed by the insulated wall portions 18 and 19 of the cabinet and by outer shells or wall panels thereof. A multiple glass pane structure 21 forms the upper portion of front wall 14 of the cabinet and extends from the one end wall 12 to the other end wall 13 thereof to provide a window across the front of the open top cabinet through which the contents on display may be viewed.

As best shown in Figure 3 of the drawings, a sheet metal member 23 extends from the one end wall 12 to the other end wall 13 of the cabinet or case and forms a horizontal partition dividing at least a portion of the interior thereof into an upper chamber and a lower chamber. Member 23 is supported at its one end on wall portion 19 of the cabinet and upon front and rear channel irons 24 intermediate wall portion 18 and the end wall 12 thereof (see Figures 2 and 4). The rear portion of the upper chamber is closed off from communication with the lower chamber. A sheet metal structure interposed between the front channel iron 24 and the inner surface of the lower insulated part of cabinet front wall 14 includes walls forming a duct means or passageway 26 (see Figures 2 and 5) provided with an inlet opening 27 thereabove (see Figures 2 and 4). The sheet metal structure forming duct means 26 extends substantially across the entire front of the display case and is terminated short of cabinet end wall 12 as at 28 (see Figure 5) to provide an outlet opening therefor, communicating with an air treating compartment to be presently described. A portion of the sheet metal structure of duct 26 adjacent the outlet end 28 thereof depends to the bottom wall 11 of the cabinet to form an enlarged or vertically elongated duct portion 29 (see Figures 4 and 5). A vertical partition 31 (see Figures 3 and 5) extends transversely across the lower chamber of the cabinet and divides the same into an air treating compartment 32, adjacent end wall 12 of the cabinet, and a plenum compartment 33 intermediate this partition and wall portion 18 of the cabinet. A refrigerating means in the form of a finned tube evaporator 34, of the closed refrigerating system associated with the cabinet, is located in compartment 32 for chilling air in the cabinet to sub-zero temperatures. The vertical partition 31 is provided with an opening or hole therein affording communication between the air treating compartment 32 and the plenum compartment 33. A fan or centrifugal blower, located within a housing 36 adjacent the opening in partition 31, is driven by an electric motor 37. Housing 36 is disposed in the plenum compartment 33 and has an inlet opening communicating with the hole in partition 31. Housing 36 is also provided with a spout-like discharge outlet 38 located below a horizontal perforated metal sheet or screen 39 disposed in and extending across the plenum compartment 33.

A food supporting device or structure is inset within the cabinet or within the upper chamber of the display case for storing and displaying packages of ice cream or sherbets and the like. The food supporting device rests on the upper part of the opposed channel irons 24 in a spaced relation to partitioning member 23 to provide a horizontal passageway 41 therebetween (see Figures 2, 3 and 4). A glass plate 42, spaced inwardly from the multiple glass pane portion 21 of front cabinet wall 14, is supported in an upright position by a plurality of spaced apart mounting brackets 43 secured to the top wall of the sheet metal structure forming the air duct means 26 (see Figures 2 and 4). Plate 42 forms a vertical passage or flue in the upper chamber of the display case, which extends substantially throughout the length of the cabinet in the front thereof. Brackets 43 space plate 42 vertically from the top wall of the sheet metal structure of duct means 26 for a purpose to be hereinafter described. The food supporting device or structure is coextensive with partitioning member 23 and includes a plurality of flat plates 46 (see Figure 3) and longitudinally spaced apart narrow vertical sleeve-like or hollow flue forming elements, generally represented by the reference character 47, which divide the food supporting device and/or upper chamber of the display case into a plurality of open top food storage compartments. The flue forming elements 47 terminate below the top of walls 12, 13, 14 and 15 of the cabinet slightly above the top of glass plate 42 (see Figure 2). Partitioning member 23 is provided with an opening 48 (see Figures 3 and 9) affording communication between the plenum compartment 43 and the horizontal passageway 41 below the food supporting device. A baffle 49, having central transversely extending elongated openings 50 therein, is secured to member 23 in any suitable or conventional manner such as by screws 51 (see Figure 9) and is located over the opening 48 in partition 23. An inverted perforated metal pan-like member or screen 53 is disposed in horizontal passageway 41. Member 53 extends to within a few inches of each end of the upper chamber in the cabinet (see Figure 3) and is spaced from the front and back walls thereof (see Figures 2 and 4). This inverted pan-like screen member 53 may be secured in position in any suitable or conventional manner and forms a perforated air channel in the bottom of passageway 41 immediately above partition member 23 for a purpose to be hereinafter described.

Each of the hollow flue forming elements 47 includes a plurality of metal pieces welded together to form the vertical flue structures. For example, each element 47 has feet-like metal portions 56 secured to its open bottom end part, which communicates with passageway 41, and upon which the plates 46 rest. The vertical flues formed by elements 47 are bounded by upright metal wall portions 58. Baffles 59 (see Figures 4 and 6) extend into the open bottom of the flues and depend therefrom a short distance into the passageway 41. These baffles 59 provide air scoops and are held in place by being welded or otherwise suitably secured to spaced apart alternate ears 61 either formed inwardly from the wall portions 58 or from the legs 56 on elements 47 (see Figure 8). Each flue forming element 47 is open at its upper end and a removable metal cap 63 (see Figure 6) is placed over this open upper end. Cap 63 is cut out to provide openings 64 and inwardly bent lips 66 (see Figures 6 and 7). The openings 64 on the sides of each cap 63 are arranged in staggered relation and the lips 66 serve as stops for limiting downward telescoping movement of a cap onto an element 47. A restricting or diffusing member 68 (see Figures 4, 6 and 7), provided with a row of holes 69 therein, is located in the top portion of flue forming elements 47 for a purpose to be hereinafter described. The lower part of the front narrow side or end edge of each of the flue forming elements 47 is cut out or provided with an opening as at 71 (see Figures 2, 4 and 8) for a purpose to be hereinafter described. An angled piece of sheet metal 73 (see Figures 4 and 8) is secured within each of the flue elements 47 near the front thereof and is disposed in an inclined position therein for cooperation with the lower open front end or edge portion 71 of the elements 47. A brace 74, in the form of an angled piece of sheet metal (see Figure 4), is secured within each of the hollow elements 47 intermediate their peripheral edges to prevent collapsing of their upright wall portions 58, by packaged food products stored in the compartments adjacent thereto, along the long sides thereof. The flue forming elements 47 and plates 46 are separate from and independent of one another and are movable relative to each other so as to permit the size of the open top compartments of the food supporting device within the display case to be varied.

The sleeve-like or hollow narrow flue forming elements in the present disclosure divide the entire packaged ice cream load in the display case into smaller groups thereof so that the groups of packages can be refrigerated primarily by conduction while at the same time providing a blanket of cold protective air thereover in the vicinity of the open top of the case. Assume now that the display case has been lowered to the desired temperature and packages of ice cream have been stacked in vertical rows or tiers in the open top compartments of the case. Such rows or tiers should never be extended above the lower edge of the caps 63 on the flue forming elements 47. During operation of the refrigerating system, to cause evaporation of refrigerant in evaporator 34 as is well known to those skilled in the art, the electric motor 37 is energized to rotate the blower in housing 36. The blower draws air over evaporator 34, which evaporator cools the air to approximately —35° F., and this sub-zero air is drawn into housing 36, through the hole in the vertical partition 31, whereupon it is discharged out of housing 36 into the plenum chamber 33 at a relatively great velocity by way of the spout-like outlet 38 of housing 36 below the screen 39 in compartment 33. The air passes through screen 39 into the upper portion of plenum compartment 33 at a temperature of approximately —30° F. Screens 39 serves to break up turbulence of the air as it leaves the blower and tends to spread this air evenly throughout the upper portion of compartment 33. The cold air passes out of plenum compartment 33 through the opening 48 in partitioning member 23 and is directed beneath the screen 53, in passageway 41 by the wing-like side portions of baffle 49. Baffle 49 directs air, now at a temperature of approximately —28° F., lengthwise of the display case in opposite directions therefrom. Some air passing through opening 48 in partition 23 also flows through the central elongated openings 50 in baffle 49 upwardly and through screen 53. Baffle 49 further breaks up turbulence of the air and this air flows along the air channel below screen 53 uniformly toward both ends of the cabinet. Air passes through the plurality of holes in perforated pan-like member or screen 53, flows along the plates 46 and is scooped into the open bottom end of the vertical flues, formed by elements 47, by virtue of the baffles 59 depending therefrom.

Air entering the vertical flues, between the walls 58 thereof, and flowing upwardly therein strikes the restrictor or diffuser member 68 whereupon it is retarded in its circulation. Air flows through the holes 69 in member 68 and egresses from the flues at a temperature of approximately —15° F. by way of the elongated openings 64 in flue caps 63. Air passing through holes 69 in diffuser member 68 is evened out along the length of the flues and strikes the lips 66 of caps 63, flows around these lips, strikes the tops of caps 63 whereupon it is deflected downwardly and laterally out of the flues at a greatly reduced velocity and flows over and upon the top of the stacks or tiers of packaged ice cream stored in the open topped compartments of the food supporting device of the display case. This air flowing upon the packages of ice cream forms a buffer blanket of air at approximately —15° F. over the packages to refrigerate the top of the upper packages by convection currents. The buffer blanket of cold air is relatively quiet as compared to the circulation of air up to this point and therefore does not create too great a turbulence adjacent the open top of the compartments which otherwise would cause ambient air outside of the display case or above the flue elements 47 to readily mix with the cold refrigerated air within the cabinet. Since the outer packages of the groups of packaged ice cream in the vertical rows or tiers are disposed in contact with the plates 46 and flue elements 47 they are refrigerated by conduction and are substantially surrounded by air at a sub-zero temperature to maintain the ice cream in a hard-frozen condition at a temperature below 0° F.

The air from the buffer blanket thereof flows toward the front of the case over the glass plate dam 42 and into the passage between this plate and the multiple glass pane structure 21. This returning air enters the inlet opening 27 of the longitudinal return duct 26 and flows therethrough lengthwise of the display case toward cabinet end wall 12 whereupon the returning air spreads throughout the vertically elongated portion 29 of the duct 26 prior to egressing therefrom by way of the duct outlet 28. The air completing its cycle and returning to the treating or cooling compartment 32 is permitted to spread out therein prior to being drawn over and/or through the finned tube type evaporator 34. The air circulation just described maintains a high rate of flow through the main ducts or passages to prevent too much warm up of the sub-zero air before it leaves the flue forming elements 47. Elements 47 equally distribute air, at a reduced velocity and volume, through the series of slots on each side thereof near their top.

As before stated not all of the air entering the flues is exhausted outwardly of the upper end thereof. Air retarded by the restricting holes in diffuser member 68 is by-passed into the return air duct or passage 26. That is, this retarded relatively dry air is permitted to return to duct 26 without passing over or forming a part of the buffer blanket of air on top of the tiers of packaged ice cream in the open topped compartments. The inclined piece of angled sheet metal 73 within each of the flue forming elements 47 forms a baffle which is terminated in vertical spaced relation to the restricting or diffuser means 68 to provide a dam within the flues adjacent the opening 71 in their narrow front edge. Metal piece 73 directs air upwardly in a flue and air retarded by member 68 therein may overflow the dam or baffle 73 and pass out of the flue by way of the opening 71. This retarded air flows out of the flue forming members 47 through the front side edge opening 71 therein and passes out of the upper chamber or compartments of the display case by way of the space provided between the top of the sheet metal structure of return duct 26 and the bottom edge of glass plate 42. Thus a dual air return is provided from the product storage chamber which prevents all air, cooled to a sub-zero temperature, from being exposed to air ambient to or above the open top of the storage compartments of the food storage device in the display case. The air by-passed as described mixes with air returning from the protective blanket thereof to provide a uniform temperature or blended body of air flowing over the evaporator. By by-passing air out of the front side or end edge of the flues a high rate of velocity of circulated air is maintained within portions or ducts of the display case, which results in less sensible heat being accumulated in the incoming air before it flows out of the ducts to cool the food load, even though the velocity of air at a desired point in its circulation is substantially reduced to provide the buffer blanket of air over packages of ice cream stored therein.

I have provided an improved open top ice cream storage or display case of the type wherein sub-zero temperatures may be maintained without creating a substantial turbulence or mixing with air above the open top of the cabinet. My improved air circulation permits a more uniform maintenance of air throughout all portions of the cabinet by the use of a single air circulating means. The air ducts, passages, etc. throughout the display case are of such design and nature as to provide a high velocity of cooling air within the case and yet affording a relatively quiet or slow flowing buffer blanket of air at the open top of the case. By opening the lower front edge or end portion of the relatively narrow hollow flue forming elements in the presently disclosed cabinet, I have provided a novel arrangement for by-passing air to the air cooling or treating compartment of the cabinet which has been found to be essential particularly in open top display cases wherein sub-zero temperatured air is circulated.

While the form of embodiment of the invention as herein disclosed constitutes a preferred form, it is to be understood that other forms might be adopted as may come within the scope of the claims which follow.

What is claimed is as follows:

1. An elongated substantially open top display case comprising, a food supporting device inset within the open top of said case and dividing the interior thereof into an upper and a lower region, said device including longitudinally spaced apart hollow vertical flue forming elements extending transversely across the case and dividing said upper region thereof into a plurality of open top compartments, means below said device for cooling air in said lower region of the case, means for circulating air cooled by said cooling means upwardly through said flue forming elements, means at the upper end portion of said elements for deflecting air egressing therefrom across said compartments to form a buffer blanket of cold air over foods stored therein prior to its return to the lower region of said case, the lower portion of at least one side edge of said flue forming elements being provided with an opening, means within said elements for restricting the flow of air therein to said deflecting means thereof, and means for directing air retarded by said restricting means out of said elements through the opening in said side edge thereof whereby the retarded air by-passes said blanket of air and is directly returned to said lower region of the case.

2. An elongated substantially open top display case comprising, a food supporting device inset within the open top of said case and dividing the interior thereof into an upper and a lower region, said device including longitudinally spaced apart hollow vertical flue forming elements extending transversely across the case and dividing said upper region thereof into a plurality of open top compartments, means below said device for cooling air in said lower region of the case, means for circulating air cooled by said cooling means in a direction lengthwise of said case and upwardly through said flue forming elements, deflecting means at the upper end portion of said elements for directing air egressing therefrom across said compartments to form a buffer blanket of cold air over foods stored therein prior to its return to the lower region of the case, at least one side edge of said flue forming elements being open at the bottom thereof, a perforated member within and coextensive with said elements for restricting the flow of air therein to said deflecting means, and an angularly disposed baffle within said elements for directing air retarded by said member out of said elements through the open side edge portion thereof whereby the retarded air by-passes said blanket of air and is directly returned to said lower region of the case.

3. In a refrigerated display case, an elongated substantially open top cabinet including a bottom wall, upright end walls and upright front and back walls, a horizontal partitioning member extending from one end wall to the other end wall of said cabinet and dividing at least a portion of the interior thereof into an upper chamber and a lower chamber, a food supporting device inset within said upper chamber and mounted in spaced relation to said member to provide a horizontal passageway therebetween, said device including longitudinally spaced apart hollow vertical flue forming elements extending transversely across said cabinet and dividing said upper chamber into a plurality of open top food storage compartments, said flue forming elements having their lower end communicating with said horizontal passageway, a vertical partition extending transversely across said lower chamber and dividing the same into an air treating compartment at one end of said cabinet and a plenum compartment adjacent thereto, a plate within said upper chamber extending throughout the length thereof in spaced relation to said cabinet front wall to provide a passage therebetween, a return air duct means below said plate and extending along the front wall of said cabinet, said duct means having an inlet opening communicating with the space between said plate and said cabinet front wall and an outlet communicating with said air treating compartment, an opening in said horizontal partitioning member providing communication between said plenum compartment and said horizontal passageway, said vertical partition having an opning therein providing communication between said plenum compartment and said air treating compartment, refrigerating means within said air treating compartment for cooling air in said cabinet, means for circulating cold air from said air treating compartment into said plenum compartment, from said plenum compartment into said horizontal passageway, lengthwise of said cabinet in said horizontal passageway upwardly into said flue elements, out of said flue elements over foods stored in said open top compartments, downwardly through said flue at the front of said upper chamber into said return air duct means and lengthwise of the cabinet therethrough into said air treating compartment.

4. A refrigerated display case according to claim 3 wherein a perforated channel-like member extends substantially from end to end of the case within the horizontal passageway to equalize air distribution into the longitudinally spaced apart hollow vertical flue forming elements.

5. A refrigerated display case according to claim 3 wherein the lower portion of one side edge of the hollow vertical flue forming elements is open to permit some of the air entering the same to by-pass the flue at the front of the cabinet and be returned directly to the air treating compartment.

6. A refrigerated display case according to claim 3 wherein the lower portion of one side edge of the hollow vertical flue forming elements is open and an air restricting means is located therein for retarding the flow of air therethrough and directing the retarded air therefrom through the open lower portion of the side edge thereof.

7. A refrigerated display case according to claim 3 wherein a baffle at the lower end of the hollow vertical flue forming elements projects into the horizontal passageway and scoops air therefrom into the flue elements.

8. An elongated substantially open top display case comprising, a food supporting device inset within the open top of said case, said device including longitudinally spaced apart upright hollow flue forming elements extending transversely across the case and dividing said device into a plurality of open top food storage compartments, refrigerating means in said case, means for circulating air over said refrigerating means for cooling the same, duct means for conveying the cooled circulated air into the lower end of said flue forming elements and out of the top thereof onto and over foods stored in said compartments, duct means for conveying air circulated over the foods in said compartments back to said refrigerating means, a plate spaced from the front of said case and extending across said compartments forming a passage for conveying air circulated over the food therein to said second named duct means, and the lower portion of the front edge of said flue forming elements having an opening therein for by-passing some of the air entering said elements around said passage directly into said second named duct means.

9. In an elongated open top display case, a food supporting device inset therein, means spaced from the bottom of said device and forming a passageway therebetween, said device including means forming hollow vertical flues extending transversely across the case in longitudinal spaced apart relation and dividing said device into a plurality of open top food storage compartments, said flues having their bottom end open and communicating with said passageway, means for cooling air within said case, means for circulating the cooled air lengthwise of said case in said passageway and upwardly into said flues, restricting means in the top portion of said flue forming means for retarding flow of air circulated upwardly therein outwardly therefrom, a lower part of one narrow side edge of said flue forming means having an opening therein extending upwardly from the bottom of said device, and a baffle within said flue forming means for directing air retarded by said restricting means out of the flues through the opening in said side edge of said flue forming means.

10. In an elongated open top display case, a food supporting device inset therein, means spaced from the bottom of said device and forming a passageway therebetween, said device including means forming hollow vertical flues extending transversely across the case in longitudinal spaced apart relation and dividing said device into a plurality of open top food storage compartments, said flues having their bottom end open and communicating with said passageway, means for cooling air within said case, means for circulating the cooled air lengthwise of said case in said passageway, a baffle extending along said flue forming means and depending from the open bottom end of the flues into said passageway for scooping air therefrom upwardly into the flues, restricting means in the top portion of said flue forming means for retarding flow of air scooped upwardly therein outwardly therefrom, a lower part of one narrow side edge of said flue forming means having an opening therein extending upwardly from the bottom of said device, and a second baffle disposed within said flue forming means and spaced from said restricting means forming a dam within the flues whereby air retarded by said restricting means is permitted to overflow said dam and pass out of the flues through the opening in said side edge of said flue forming means.

11. A substantially open top display case comprising, a food supporting device inset within the open top of said case and dividing the interior thereof into an upper and a lower region, said device including spaced apart hollow upright flue forming elements dividing said upper region of the case into a plurality of open top compartments, means for cooling air in the lower region of said case, means for circulating air cooled by said cooling means upwardly from said lower region through said flue forming elements, means at the upper end portion of said elements for deflecting air egressing therefrom laterally thereof across said compartments to form a buffer blanket of cold air over foods stored in the compartments, means forming a return passage for conducting air from said blanket thereof to the lower region of said case to be recooled by said cooling means, the lower portion of at least one end of said flue forming elements being provided with an opening, means within said elements for restricting the flow of air therein to said deflecting means thereof, and the opening in the end of said elements by-passing cold air retarded by said restricting means around said blanket of air and at least a part of said return passage into the lower region of said case.

12. A refrigerated display case according to claim 11 wherein a perforated air distributing member is interposed between the air circulating means and the upright hollow flue forming elements and extends substantially across the case to equalize the flow of air into the spaced apart elements.

13. A substantially open top display case comprising, a food supporting device inset within the open top of said case and dividing the interior thereof into an upper and a lower region, said device including spaced apart hollow upright narrow flue forming elements dividing said upper region of the case into a plurality of open top compartments, means within said case for cooling air therein, means for circulating air cooled by said cooling means upwardly into said flue forming elements, means at the upper end portion of said flue elements for deflecting air egressing therefrom laterally thereof over foods stored in said compartments, means forming a return passage for conducting air from said compartments to said cooling means to be recooled thereby, at least one end of said narrow flue forming elements being provided with an opening in the lower portion thereof, and the opening in the end of said elements by-passing some of the air entering the same away from said compartments and around a part of said return passage to said cooling means.

References Cited in the file of this patent

UNITED STATES PATENTS

| Number | Name | Date |
|---|---|---|
| 2,574,242 | Brill | Nov. 6, 1951 |
| 2,608,068 | Rydin | Aug. 26, 1952 |